US008576413B2

(12) United States Patent
Ito (10) Patent No.: US 8,576,413 B2
(45) Date of Patent: Nov. 5, 2013

(54) PRINTING SYSTEM, PRINTING APPARATUS, PRINT SETTING METHOD AND RECORDING MEDIUM

(75) Inventor: Atsushi Ito, Yawata (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1247 days.

(21) Appl. No.: 12/254,528

(22) Filed: Oct. 20, 2008

(65) Prior Publication Data
US 2009/0103132 A1 Apr. 23, 2009

(30) Foreign Application Priority Data
Oct. 19, 2007 (JP) ................................. 2007-273224

(51) Int. Cl.
G06F 3/12 (2006.01)
G06K 15/00 (2006.01)
H04N 1/40 (2006.01)

(52) U.S. Cl.
USPC ........ 358/1.13; 358/1.15; 358/1.18; 358/3.28

(58) Field of Classification Search
USPC ......... 358/1.14, 1.15, 1.9, 1.1, 1.13; 345/629, 345/635; 400/62
See application file for complete search history.

(56) References Cited

U.S. PATENT DOCUMENTS

| 5,659,795 | A * | 8/1997 | Duvall et al. | 710/15 |
| 6,335,795 | B1 * | 1/2002 | Neuhard et al. | 358/1.15 |
| 7,158,257 | B2 * | 1/2007 | Hosoda | 358/1.15 |
| 7,580,943 | B2 * | 8/2009 | Sakura et al. | 1/1 |
| 7,630,094 | B2 * | 12/2009 | Kitahara et al. | 358/1.15 |
| 7,656,546 | B2 * | 2/2010 | Lay et al. | 358/1.15 |
| 2002/0171857 | A1 * | 11/2002 | Hisatomi et al. | 358/1.13 |
| 2003/0197883 | A1 * | 10/2003 | Lay et al. | 358/1.13 |
| 2005/0030580 | A1 * | 2/2005 | Moroi | 358/1.15 |
| 2005/0088681 | A1 * | 4/2005 | Hosoda | 358/1.14 |
| 2005/0162669 | A1 * | 7/2005 | Park et al. | 358/1.1 |

(Continued)

FOREIGN PATENT DOCUMENTS

JP 11-203086 7/1999
JP 2003-76524 3/2003

(Continued)

OTHER PUBLICATIONS

Japanese Notification of Reasons for Refusal dated Sep. 29, 2009, directed towards counterpart JP Application No. 2007-273224; 6 pages.

Primary Examiner — Marivelisse Santiago Cordero
Assistant Examiner — Moustapha Diaby
(74) Attorney, Agent, or Firm — Morrison & Foerster LLP (57) ABSTRACT

A printing system has a terminal apparatus and a printing apparatus that are interconnected via a network. The terminal apparatus includes an obtainer that gains access to the printing apparatus and obtains print setting screen data stored in the printing apparatus, a display that displays on itself a print setting screen according to the obtained print setting screen data, an input part that inputs print setting data via the print setting screen displayed on a display thereof, and a transmitter that transmits the inputted print setting data to the printing apparatus. And the printing apparatus includes a receiver that receives the print setting data from the terminal apparatus, and a code generator that generates an appropriate print controlling code for the received print setting data.

8 Claims, 8 Drawing Sheets

(56) References Cited

U.S. PATENT DOCUMENTS

| | | | |
|---|---|---|---|
| 2006/0044602 A1* | 3/2006 | Kitahara et al. | 358/1.15 |
| 2006/0095145 A1* | 5/2006 | Yamada | 700/19 |
| 2006/0132834 A1* | 6/2006 | Kamimura | 358/1.15 |
| 2006/0212819 A1* | 9/2006 | Tobioka | 715/764 |
| 2006/0238786 A1* | 10/2006 | Sakura et al. | 358/1.9 |
| 2007/0223032 A1* | 9/2007 | Hashizume | 358/1.15 |
| 2007/0279670 A1* | 12/2007 | Hiruma | 358/1.14 |
| 2009/0201540 A1* | 8/2009 | Morooka | 358/1.15 |

FOREIGN PATENT DOCUMENTS

| | | |
|---|---|---|
| JP | 2006-102974 | 4/2006 |
| JP | 2006-252321 | 9/2006 |
| JP | 2006-252480 | 9/2006 |
| JP | 2006-344172 | 12/2006 |

* cited by examiner

PRINTING SYSTEM, PRINTING APPARATUS, PRINT SETTING METHOD AND RECORDING MEDIUM

This application claims priority under 35 U.S.C. §119 to Japanese Patent Application No. 2007-273224 filed on Oct. 19, 2007, the entire disclosure of which is incorporated herein by reference in its entirety.

BACKGROUND OF THE INVENTION

1. Field of the Invention

The present invention relates to a printing system in which a terminal apparatus and a printing apparatus are interconnected via a network, a printing apparatus preferably used in this printing system, a print setting method, and a computer readable recording medium having a print setting program stored therein to make a computer execute processing.

2. Description of the Related Art

The following description sets forth the inventor's knowledge of related art and problems therein and should not be construed as an admission of knowledge in the prior art.

Usually, a print setting is configured by a printer driver installed on a user's using terminal apparatus that is connected to a printing apparatus via a network, when the printing apparatus prints out print data received from the terminal apparatus. Alternatively, a print setting is configured by a printing method that is called as "PDF direct printing" which is heretofore known, for example.

In such cases described above, a print controlling code such as a PJL command that is appropriate for the print setting, is generated by an application installed on the terminal apparatus, and the generated print controlling code is transmitted to the printing apparatus, and then the printing apparatus performs printing according to the print controlling codes.

Here is an art disclosed in Japanese Unexamined Laid-open Patent Publication No. H11-203086, in which a print setting is stored and administered in a printing apparatus and an operation to call the print setting is performed on a terminal apparatus by using identification information, and the print setting is used for printing.

However, with a conventional system in which a print controlling code is generated on terminal apparatuses, each of the terminal apparatuses needs to have an exclusive application for a printing apparatus. Thus, users bother to manually install an exclusive application for a printing apparatus on their terminal apparatuses, when another terminal apparatus is provided in the system or when a new OS is installed on their terminal apparatuses. Similarly, in the case in which a plurality of printing apparatuses are employed, users bother to manually install exclusive applications for the respective printing apparatuses on their terminal apparatuses, which would be troubles on users. Further, when there is a version update to an exclusive application for a printing apparatus, users bother to manually update the exclusive application installed on their terminal apparatuses, which would be troubles on users also from the view of maintenance.

In addition, developers of a printing apparatus are required to develop tools (applications) for terminal apparatuses so that they could work suitably according to a unique function of the printing apparatus. For example, if a printing apparatus is enabled to perform a prohibition process to prohibit concurrent usage of a plurality of specific functions (prohibit folding of index sheets, for example), the developers are required to develop applications for terminal apparatuses so that they also could perform this prohibition process. That means, even for one same objective process, different configurations need to be established for different apparatuses that are respective printing apparatuses and respective terminal apparatuses, which would be a large amount of load. In addition, establishing different configurations for one same objective process may cause tricky mismatches.

And the art mentioned above, which is disclosed in Japanese Unexamined Laid-open Patent Publication No. H11-203086, does not get rid of these troubles that users and developers suffer from.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide a printing system that enables a user terminal apparatus to configure a practical print setting for a printing apparatus that is connected to the user terminal apparatus via a network, without user operations to install on the user terminal apparatus an exclusive application for the printing apparatus, and thereby reduces troubles both on users and developers.

It is another objective of the present invention to provide a printing apparatus preferably employed in the printing system.

It is yet another objective of the present invention to provide a print setting method preferably applied to the printing system.

It is still yet another objective of the present invention to provide a computer readable recording medium having a print setting program stored therein to make a computer execute processing by the print setting method.

According to a first aspect of the present invention, a printing system has a terminal apparatus and a printing apparatus that are interconnected via a network, and the terminal apparatus includes:

an obtainer that gains access to the printing apparatus and obtains print setting screen data stored in the printing apparatus;

a display that displays on itself a print setting screen according to the obtained print setting screen data;

an input part that inputs print setting data via the print setting screen displayed on a display thereof; and a transmitter that transmits the inputted print setting data to the printing apparatus, and the printing apparatus includes:

a receiver that receives the print setting data from the terminal apparatus; and a code generator that generates an appropriate print controlling code for the received print setting data.

According to a second aspect of the present invention, a printing apparatus includes:

a transmitter that transmits print setting screen data to a terminal apparatus, in response to a request for the print setting screen data is received from the terminal apparatus via a network;

a receiver that receives from the terminal apparatus via the network, print setting data inputted via a print setting screen that is displayed on the terminal apparatus according to the print setting screen data; and a code generator that generates an appropriate print controlling code for the received print setting data.

According to a third aspect of the present invention, a print setting method includes:

accessing a printing apparatus from a terminal apparatus and obtaining print setting screen data stored in the printing apparatus;

displaying a print setting screen on the terminal apparatus according to the obtained print setting screen data;

inputting print setting data via the displayed print setting screen;

transmitting the inputted print setting data to the printing apparatus;

receiving on the printing apparatus, the print setting data from the terminal apparatus; and generating on the printing apparatus, an appropriate print controlling code for the received print setting data.

According to a fourth aspect of the present invention, a computer readable recording medium having a print setting program stored therein to make a computer execute:

transmitting print setting screen data to a terminal apparatus, in response to a request for the print setting screen data, which is received from the terminal apparatus via a network;

receiving from the terminal apparatus via the network, print setting data inputted via a print setting screen that is displayed on the terminal apparatus according to the print setting screen data; and generating an appropriate print controlling code for the received print setting data.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
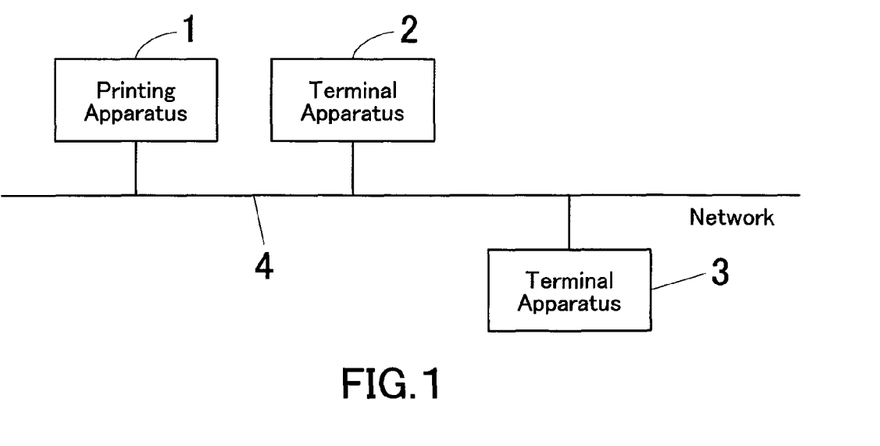
FIG. 1 is a block diagram showing a printing system in which a printing apparatus according to one embodiment of the present invention is employed.

As referred to FIG. 1 showing a configuration of a printing system, this printing system includes a printing apparatus 1, and terminal apparatuses 2 and 3 (two terminal apparatuses for example) which are interconnected via a network 4.

A MPF (Multi Function Peripheral) that is a multifunctional digital machine collectively having various functions such as copying, printing, scanning and facsimile, is employed as the printing apparatus 1. However, the printing apparatus 1 is not limited to a MFP, and also may be another printing apparatus such as a copier or a printer.

Figure 2:
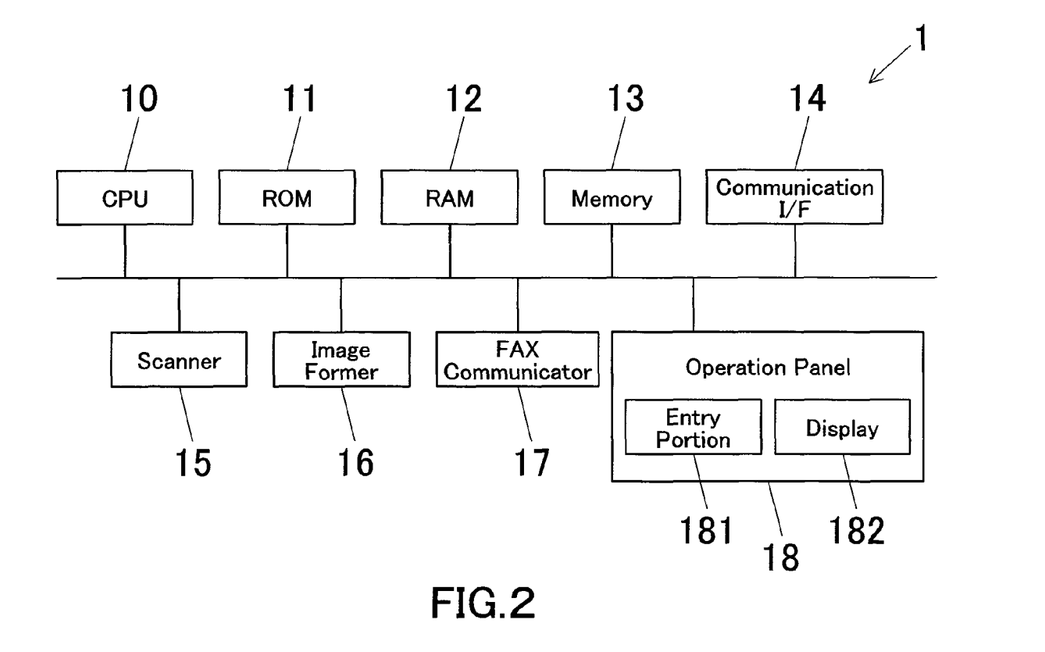
FIG. 2 is a block diagram showing a configuration of a printing apparatus.

As shown in FIG. 2, the printing apparatus 1 includes a CPU 10, a ROM 11, a RAM 12, a memory 13, a communication interface (communication I/F) 14, a scanner 15, an image former 16, a FAX communicator 17, an operation panel 18 and etc.

The CPU 10 centrally controls the entire printing apparatus 1 by executing a program stored in the ROM 11. In this embodiment, the CPU 10 controls the scanner 14, the printer 15 and etc. as generally expected for a CPU, and also controls the following operations. That is, receiving print setting data from the terminal apparatus 2 or 3, the CPU 10 generates an appropriate print controlling code for the received print setting data; gains access to the terminal apparatus and stores therein the generated print controlling code; gains access to a storage folder specified on the terminal apparatus 2 or 3 and stores therein one or more than one of the print controlling codes stored in the memory 13, if a request for that one or more than one print controlling codes is received from the terminal apparatus; and other operations.

The ROM 11 stores in itself a program executed by the CPU 10 and other data.

The RAM 12 provides an operation area for the CPU 10 to execute a program, and temporarily stores in itself a program, data used for executing a program, and other data.

The memory 13 is a recording medium such as a hard disk, and stores in itself image data read out from a document by the scanner 15, various programs and other data. In this embodiment, the memory 13 also stores in itself one or more than one generated print controlling codes that are appropriate for print setting data received from the terminal apparatus 2 or 3. Further, the memory 13 also stores in itself print setting screen data and etc. that are used for displaying a print setting screen on a web page, in order to provide that data to the terminal apparatus 2 or 3 when accessed from the terminal apparatus.

The communication interface (communication I/F) 14 functions as a transmitter/receiver that communicates with external apparatuses such as the terminal apparatuses 2 and 3, via the network 4.

The scanner 15 includes a CCD sensor and etc., and reads a document placed on a platen glass or an automatic document feeder (these are not shown in Figure) then converts it into image data.

The image former 16 prints out on a sheet image data read out from a document by the scanner 15, image data received from an external apparatus, and other image data.

The FAX communicator 17 functions as a communicator that sends/receives image data via a telephone circuit.

The operation panel 18 is used by users to perform entry operations, and gives to users messages including a notice of job completion and various screens. The operation panel 18 includes an entry portion 181 having a plurality of keys such as numeric keys and a start key, a display 182 that is a touch-panel liquid crystal display that displays on itself a mode setting screen, messages and etc.

Hereinafter, an electrical configuration of the terminal apparatus 2 will be explained with reference to FIG. 3. Since the terminal apparatus 3 has the same configuration as that of the terminal apparatus 2, explanation thereof is omitted.

Figure 3:
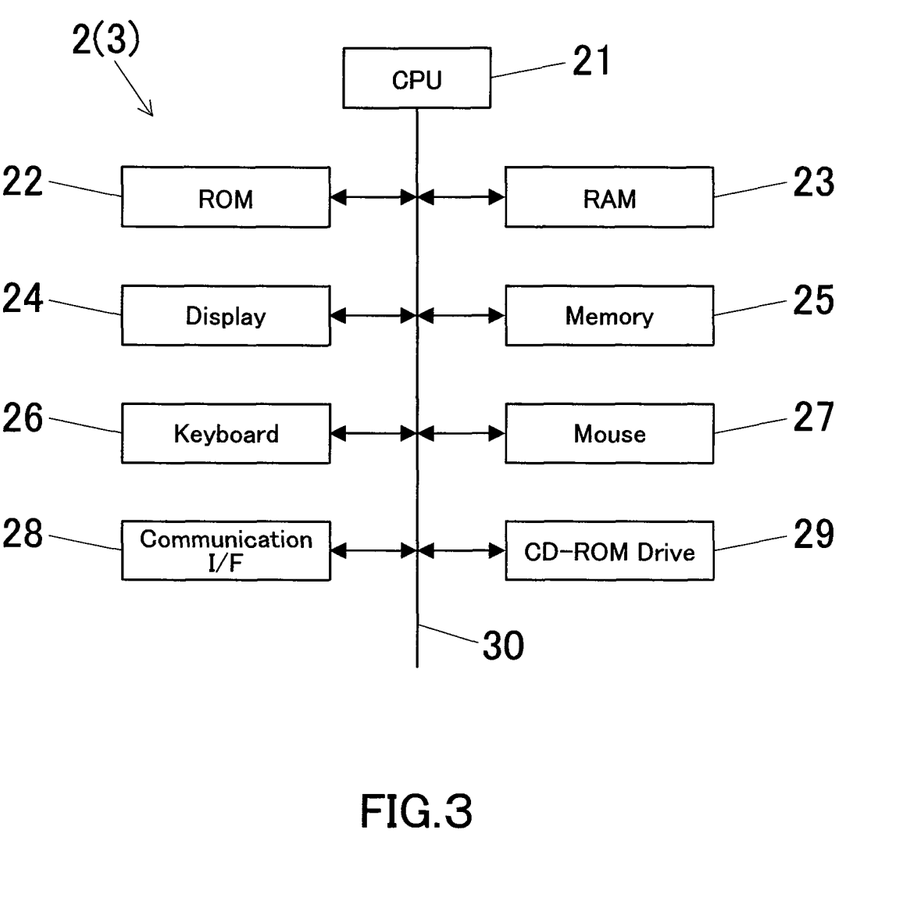
FIG. 3 is a block diagram showing a configuration of a terminal apparatus.

As shown in FIG. 3, the terminal apparatus 2 includes a ROM 22, a RAM 23, a display 24, a memory 25, a keyboard 26, a mouse 27, a communication interface (communication I/F) 28 and a CD-ROM drive 29, which are interconnected via a bus line 30 extended from a CPU 21.

The CPU 21 centrally controls the entire terminal apparatus 2.

The ROM 22 stores in itself an operation program for the CPU 21 and other data.

The RAM 23 provides an operation area for the CPU 21 to execute processing according to an operation program.

The display 24 is a display of liquid-crystal, CRT or etc., and displays on itself various messages, various screens to let users perform manual operations such as an entry reception screen and a selection screen, documents created by users, and etc. In this embodiment, the display 24 displays on a web browser, a print setting screen according to print setting screen data obtained from a printing apparatus.

The memory 25 is a recording medium such as a hard disk, and stores in itself data and various information.

The keyboard 26 and the mouse 27 are used by users to perform entry operations.

The communication interface (communication I/F) 28 exchanges various data with the printing apparatus 1 and the terminal apparatus 3. Further, in this embodiment, the communication I/F 28 obtains print setting screen data from the printing apparatus 1; transmits to the printing apparatus 1 print setting data entered via a print setting screen that is displayed on the display 24 according to the obtained print setting screen data; and receives from the printing apparatus 1 an appropriate print controlling code generated for the print setting data.

The CD-ROM drive 29 drives a CD-ROM.

Hereinafter, operations performed in the printing system of FIG. 1 will be schematically explained with reference to FIG. 4.

According to a user instruction, the terminal apparatus 2 or 3 gains access to the printing apparatus 1 via a web browser and obtains print setting screen data therefrom. Then, a print setting screen (referred to as "remote panel" in FIG. 4) is displayed on the display 24 via the web browser, according to the obtained print setting screen data.

Figure 4:
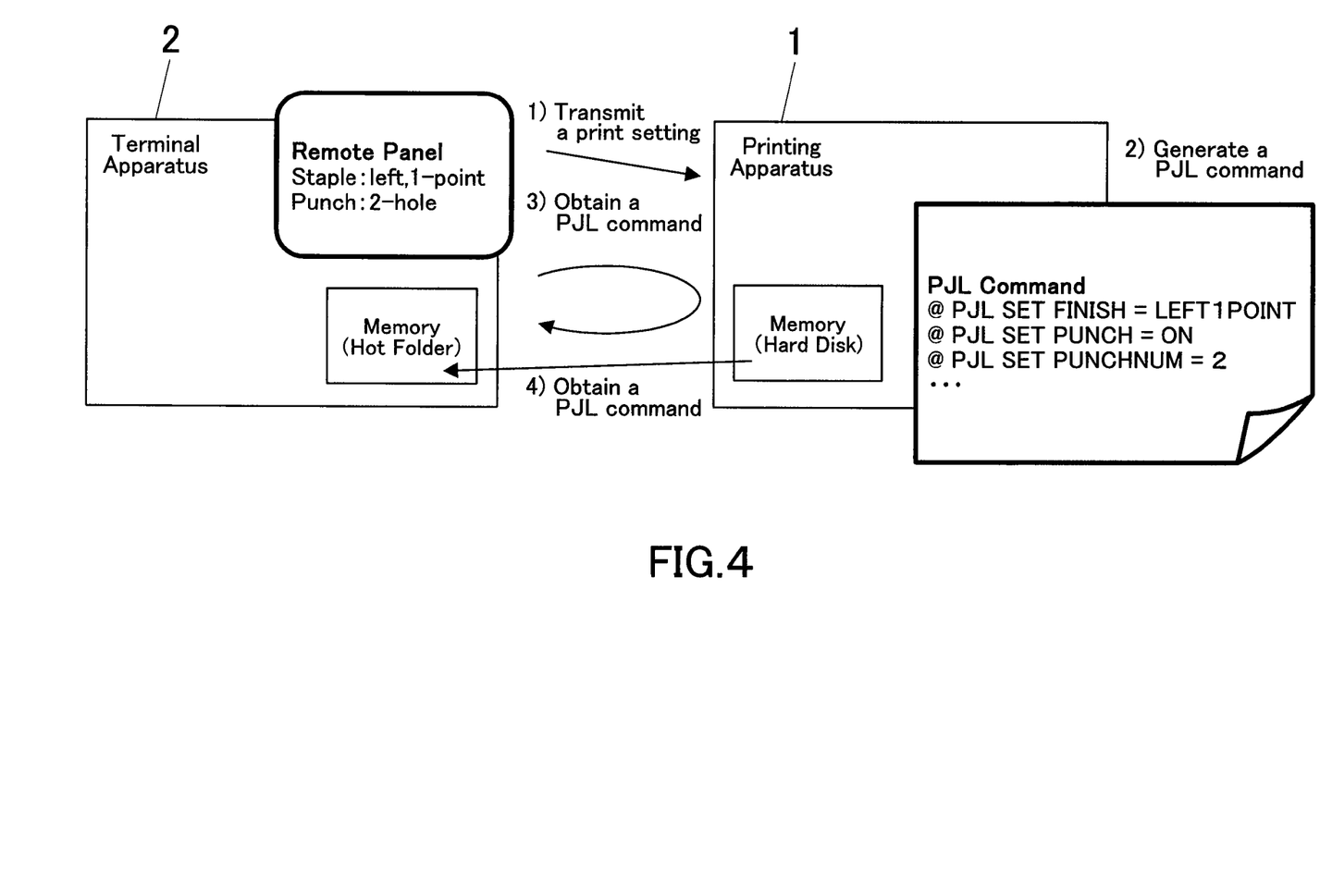
FIG. 4 is a view to schematically explain operations performed in the printing system.

Subsequently, the user configures a print setting via the print setting screen displayed thereon, for example as "Staple: left, 1-point" and "Punch: 2-hole", as shown in FIG. 4.

After configuration, this print setting is transmitted to the printing apparatus 1 (indicated by 1 of FIG. 4). Then the printing apparatus 1 generates an appropriate print controlling code for the print setting (indicated by 2 of FIG. 4), such as a PJL command (hereinafter, "print controlling code" is also referred to simply as "PJL command").

The generated print controlling code is returned and stored in the memory 25 of the terminal apparatus 2 or 3, and thus the user can obtain the generated print controlling code (indicated by 3 of FIG. 4).

The print controlling code generated in the printing apparatus 1 may be stored in the memory 13 of the printing apparatus 1. In this case, the terminal apparatus 2 or 3 specifies a storage folder and transmits a request for the print controlling code stored in the printing apparatus 1, according to a user instruction. Then the printing apparatus 1 gains access to the specified storage folder and stores the requested print controlling code therein (indicated by 4 of FIG. 4). The specified storage folder may exist in this user's using terminal apparatus, another user's using terminal apparatus, a file server, or etc.

Figure 5:
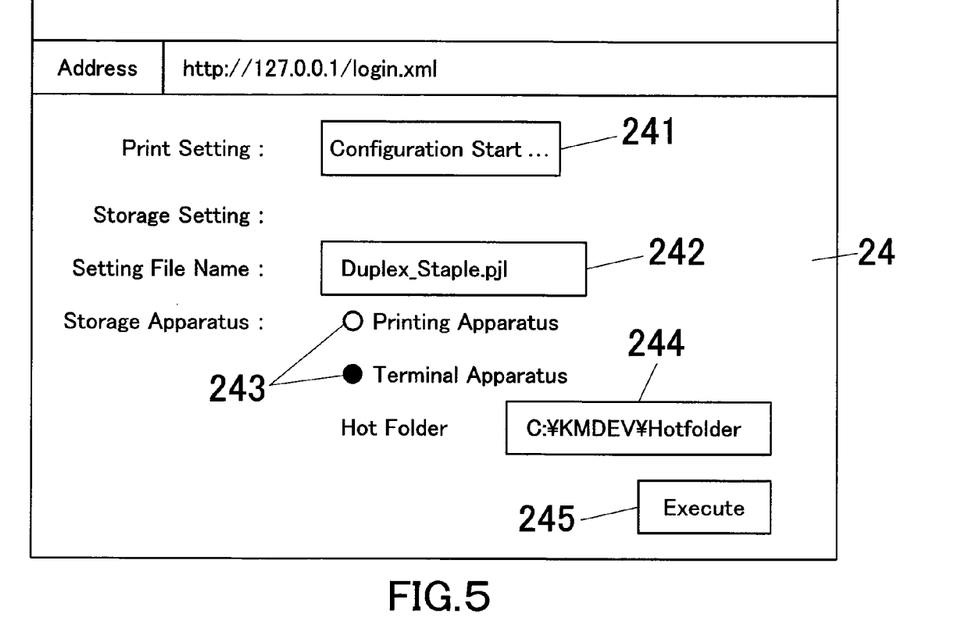
FIG. 5 is a view showing an example of a print setting operation screen displayed on a display of the terminal apparatus.

FIG. 5 is a view showing an example of a print setting operation screen that is displayed on the display 24 on a web browser when the terminal apparatus 2 or 3 gains access to the printing apparatus 1. Gaining access to the printing apparatus 1 according to a user instruction, the terminal apparatus 2 or 3 obtains print setting screen data from the printing apparatus 1 and displays on itself print setting screens such as a print setting operation screen and a print setting entry screen according to the print setting screen data.

In the print setting operation screen shown in FIG. 5, there are a "configuration start" button 241 to select whether or not to start configuration of a print setting, a setting file name entry field 242 (a file name of a file having the generated print controlling code), selection buttons 243 to decide either a printing apparatus or a terminal apparatus as a storage apparatus to store the print controlling code, a storage folder name entry field 244, and an "execute" button 245.

Figure 6:
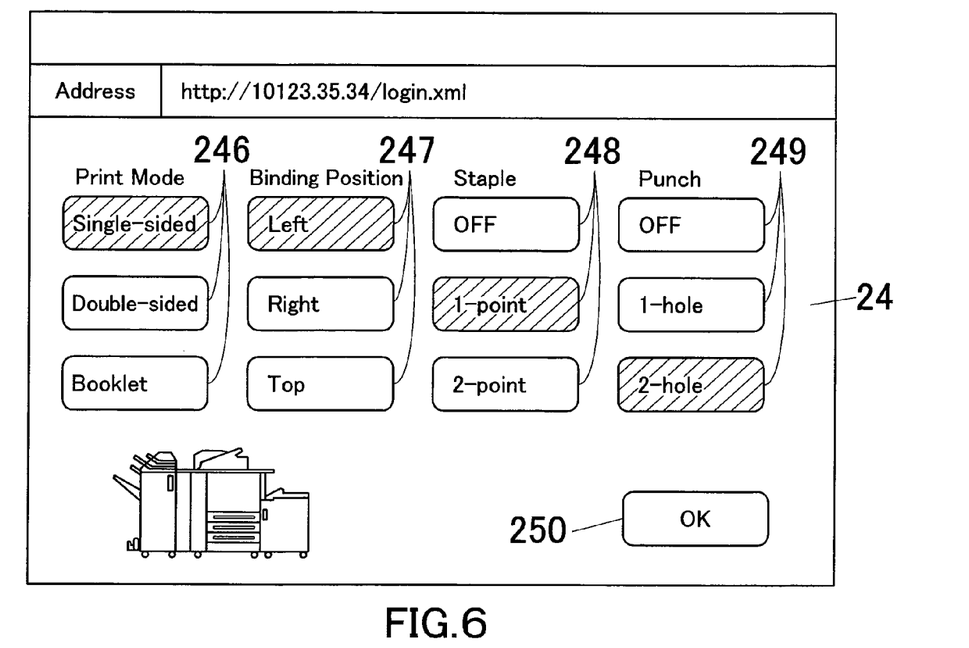
FIG. 6 is a view showing an example of a print setting entry screen displayed on a display of the terminal apparatus.

When a user presses the "configuration start" button 241, a print setting entry screen shown in FIG. 6 is displayed on the display 24. This print setting entry screen is also displayed on a web browser according to the print setting screen data obtained from the printing apparatus 1. Further, this screen is exactly the same as the one that is displayed on the display 182 of the printing apparatus 1 when a print setting is configured on the printing apparatus 1.

In the print setting entry screen shown in FIG. 6, there are print mode selection buttons 246, binding position selection buttons 247, staple selection buttons 248, punch selection buttons 249, and an "OK" button 250. In this example, there are "single-sided", "double-sided" and "booklet" as print mode options; "left", "right" and "top" as binding position options; "OFF", "1-point" and "2-point" as staple options; and "OFF", "1-hole" and "2-hole" as punch options, and the buttons marked with diagonal lines indicate as being selected.

When the "OK" button 250 is pressed, the screen returns to the print setting operation screen of FIG. 5.

Returning to the print setting operation screen, the user enters a setting file name in the setting file name entry field 242, and selects one of the selection buttons 243 to decide either a printing apparatus or a terminal apparatus as a storage apparatus, and then enters a folder name in the storage folder name entry field 244. If the user selects a terminal apparatus, then he/she specifies as "hot folder", a shared storage folder existing in a terminal apparatus. He/she also may specify a storage folder existing in another terminal apparatus.

And then, when the user presses the "execute" button 245, the entered information is transmitted to the printing apparatus 1.

Figure 7:
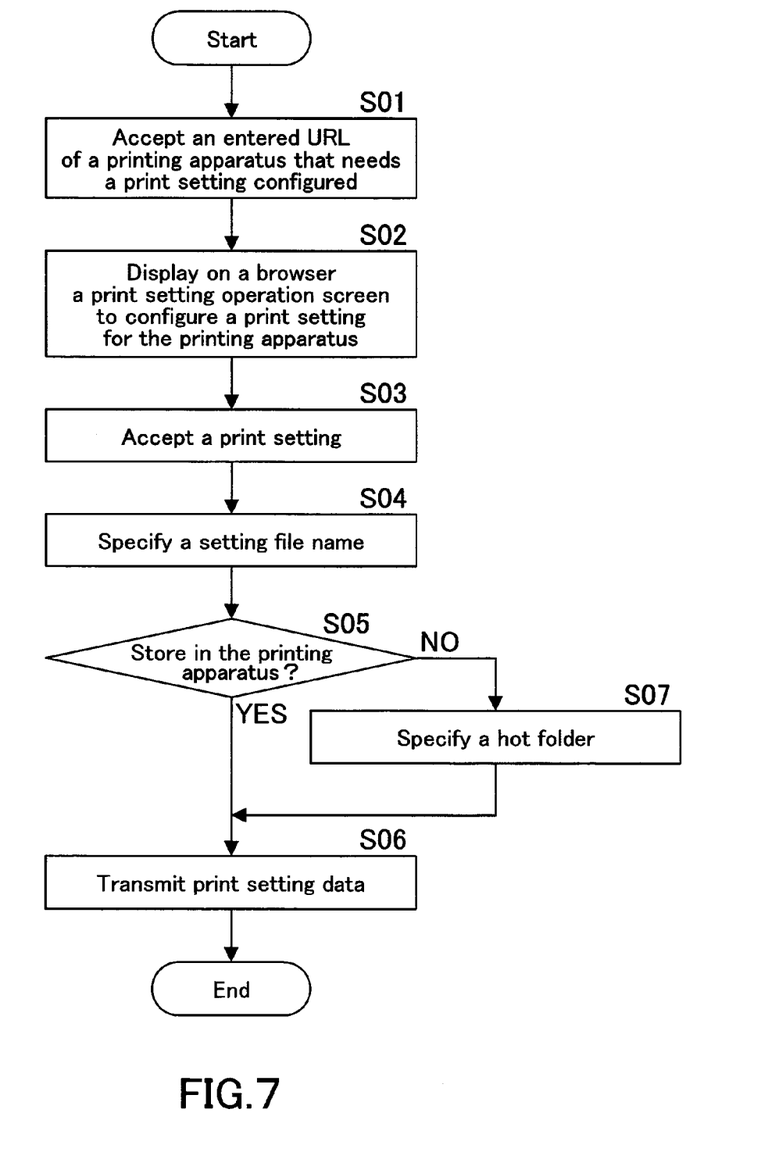
FIG. 7 is a flowchart showing a procedure executed in the terminal apparatus when a user performs an entry operation.

FIG. 7 is a flowchart showing a procedure executed in the terminal apparatus 2 or 3 when a user performs entry operations as described above. This procedure is executed by the CPU 21 according to an operation program stored in a recording medium such as the ROM 22.

In Step S01, an entered URL (Uniform Resource Locator) of the printing apparatus 1 that needs a print setting configured is accepted in Step S01. And the print setting operation screen of FIG. 5 is displayed on a browser in Step S02.

Then, information entered via the print setting entry screen of FIG. 6 is accepted in Step S03. According to the information entered by a user, a setting file name is designated in Step S04, and it is judged whether or not a print controlling code should be stored in the printing apparatus 1, in Step S05.

If it should be stored in the printing apparatus 1 (YES in Step S05), the routine proceeds to Step S06. If it should be stored in a terminal apparatus (NO in Step S05), a storage folder is specified as the hot folder, in Step S07. Then the routine proceeds to Step S06.

In Step S06, when a user presses the "execute" button 245, the entered print setting data is transmitted to the printing apparatus 1.

Figure 8:
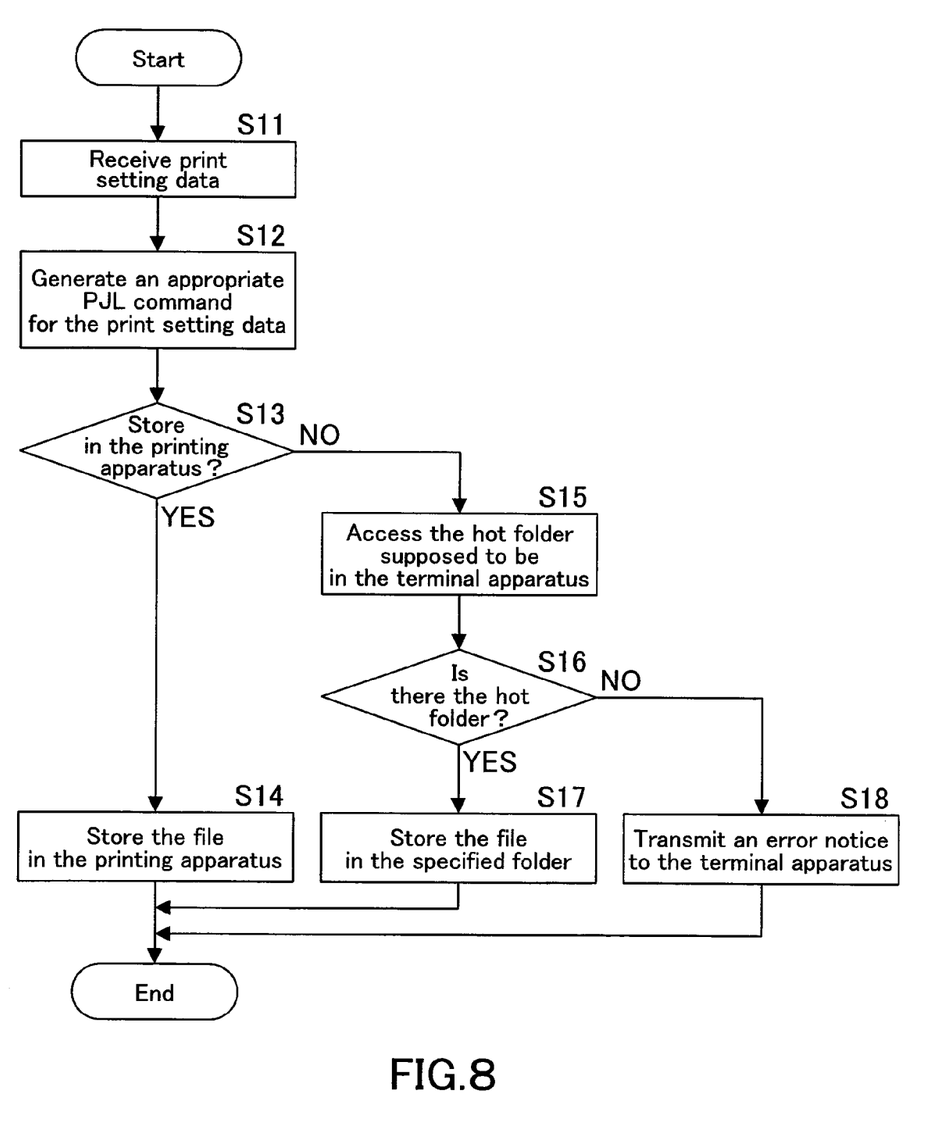
FIG. 8 is a flowchart showing a procedure executed in the printing apparatus when the printing apparatus receives print setting data.

Hereinafter, a procedure executed in the printing apparatus 1 when the printing apparatus 1 receives the print setting data, will be explained with reference to FIG. 8.

This procedure is executed by the CPU 10 of the printing apparatus 1 according to an operation program stored in a recording medium such as the ROM 11.

In Step S11, a command requiring creation of a print controlling code and the print setting data are received from the terminal apparatus 2 or 3. And an appropriate PJL command for the received print setting data is generated in Step S12.

Then in Step S13, it is judged a file having the generated PJL command should be whether stored in the printing apparatus 1 or transmitted to the terminal apparatus 2 or 3, based on the data received from the terminal apparatus.

If a file having the generated PJL command should be stored in the printing apparatus 1 (YES in Step S13), that file is stored in the memory 13 of the printing apparatus 1 with a specified file name, in Step S14. If it should be stored in the terminal apparatus 2 or 3 (NO in Step S13), an access to the hot folder supposed to be in the terminal apparatus is made in Step S15, and it is judged whether or not there is the specified folder therein, in Step S16. If there is the specified folder (YES in Step S16), the file having the PJL command is stored in the specified folder with a designated file name, in Step S17. If there is not the specified folder (NO in Step S16), an error notice is transmitted to the terminal apparatus 2 or 3 and the generated PJL command is discarded, in Step S18. As an alternative for discarding the PJL command, this embodiment can be configured to allow a user to select whether to specify another folder or to store the command in the printing apparatus 1.

Further, the generated PJL command may be stored in a shared area of the memory 13 of the printing apparatus 1, in order to allow a plurality of users to use the PJL command. Alternatively, the PJL command may be stored in a personal area thereof, in order to allow only a user requesting creation of the PJL command to use the PJL command. If the PJL command is stored in a personal area thereof, authentication of a user trying to obtain the PJL command from the personal area, may be performed by using a user authentication function (not shown in Figure) of the printing apparatus 1.

When a user would like to print a document or etc., he/she simply transmits to the printing apparatus 1, a preferable document or etc. with the PJL command generated in the printing apparatus 1.

As described above in this embodiment, the terminal apparatus 2 or 3 gains access to the printing apparatus 1 and obtains print setting screen data from the printing apparatus 1, and displays a print setting screen on the display 24 according to the print setting screen data, and then a user enters print setting data via the print setting screen. That is, according to the print setting screen data obtained from the printing apparatus 1, the print setting screen is displayed on the display 24 of the printing apparatus 2 or 3 on a web browser or etc. that is a general-purpose application used on terminal apparatuses. Thus, users can configure a print setting via a web browser or etc. that they usually use on their terminal apparatuses, without user operations to install thereon an exclusive application for a printing apparatus.

Further, the PJL command that is appropriate for the print setting data entered by the user is generated in the printing apparatus 1. Thus, even if firmware on the printing apparatus 1 is updated, no operation is needed on the terminal apparatus 2 or 3, in other words, users do not have to bother to manually update an application installed on their terminal apparatuses, which would reduce troubles on users.

Further, the print setting data is inputted via the print setting screen that is displayed according to the print setting screen data obtained from the printing apparatus 1, and thereby a practical print setting for the printing apparatus 1 can be properly configured on the terminal apparatus 2 or 3. Thus, developers of the printing apparatus do not have to develop a prohibition processor for terminal apparatuses, and only have to develop it for the printing apparatus, which would reduce troubles on developers.

Hereinafter, a procedure executed in the terminal apparatus 2 or 3 to obtain one or more than one of the files having PJL commands, which are stored in the memory 13 of the printing apparatus 1, will be explained.

Figure 9:
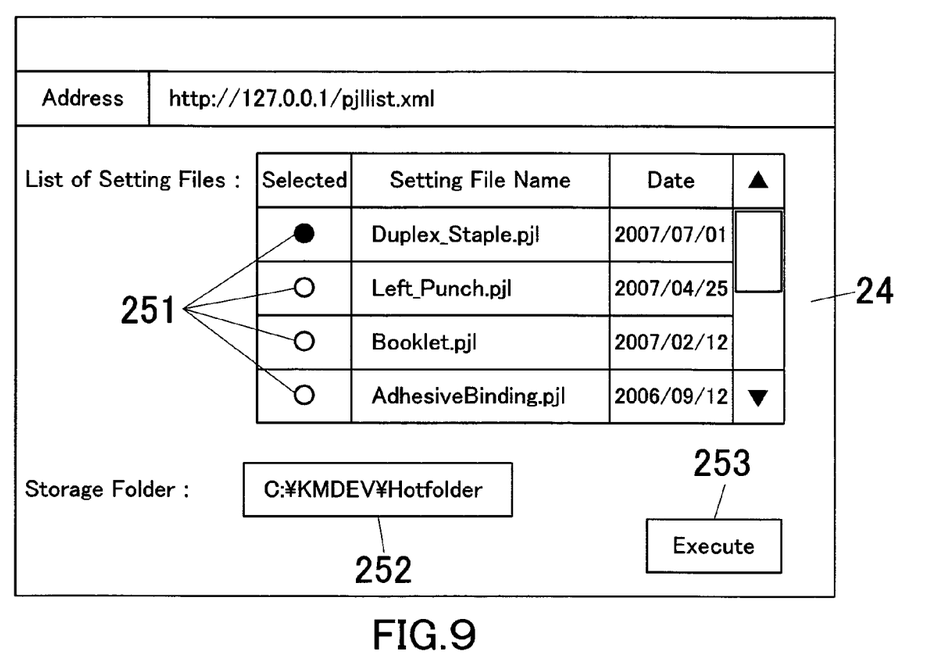
FIG. 9 is a view showing an example of a print controlling code obtaining screen displayed on a display of the terminal apparatus.

The terminal apparatus 2 or 3 gains access to the URL of the printing apparatus 1, then a screen shown in FIG. 9 is displayed on the display 24 of the terminal apparatus. In this screen, a file name, a date and a selection button 251 are displayed for each file having a PJL command. Further, in this screen, a storage folder entry field 252 to enter a storage folder to store a file having an obtained PJL command, and a "execute" button 253 are also displayed. Meanwhile, in the print setting operation screen of FIG. 5, a button to jump to the PJL command obtaining screen of FIG. 9 may be also displayed. And the PJL command obtaining screen of FIG. 9 may be automatically displayed after a PJL command is generated, if the printing apparatus 1 is selected as a storage apparatus to store the generated PJL command, via the print setting operation screen of FIG. 5. Thus, this embodiment having such a configuration would be very useful for a user who would like to obtain the generated PJL command after entry of a print setting.

Via the PJL command obtaining screen of FIG. 9, a user presses one of the selection buttons 251 for a preferable PJL command. In the example of FIG. 9, a file name and a date are displayed for each file just for example. Additionally, a user name of a user instructing creation of a PJL command or another item for easy file administration may be given for each file in this screen, so that the files could be rearranged in a list according to the items. Further, the files listed in this screen may not include only those which commands are generated according to instructions of the user currently making an access, but also may include those which commands are generated according to other users. Users may select one or more than one files.

In the storage folder entry field 252, the user may specify a folder existing in his/her terminal apparatus, another user's terminal apparatus, or a file server shared with a plurality of users.

When the user presses the "execute" button 253, the printing apparatus 1 gains access to the specified folder, and if it is judged that the folder has a writable area, a file having a PJL command is stored in the folder. If the specified folder does not exist, an error notice is transmitted to the terminal apparatus. Alternatively, the user may be requested to specify a folder again.

Figure 10:
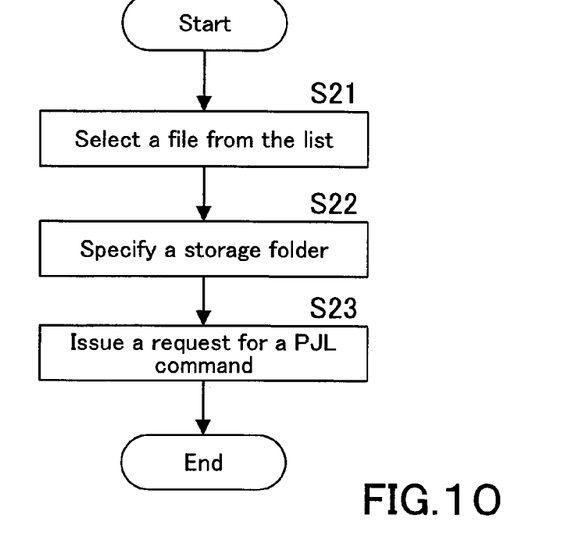
FIG. 10 is flowchart showing a procedure executed in the terminal apparatus when the terminal apparatus obtains a print controlling code stored in the printing apparatus.
Figure 11:
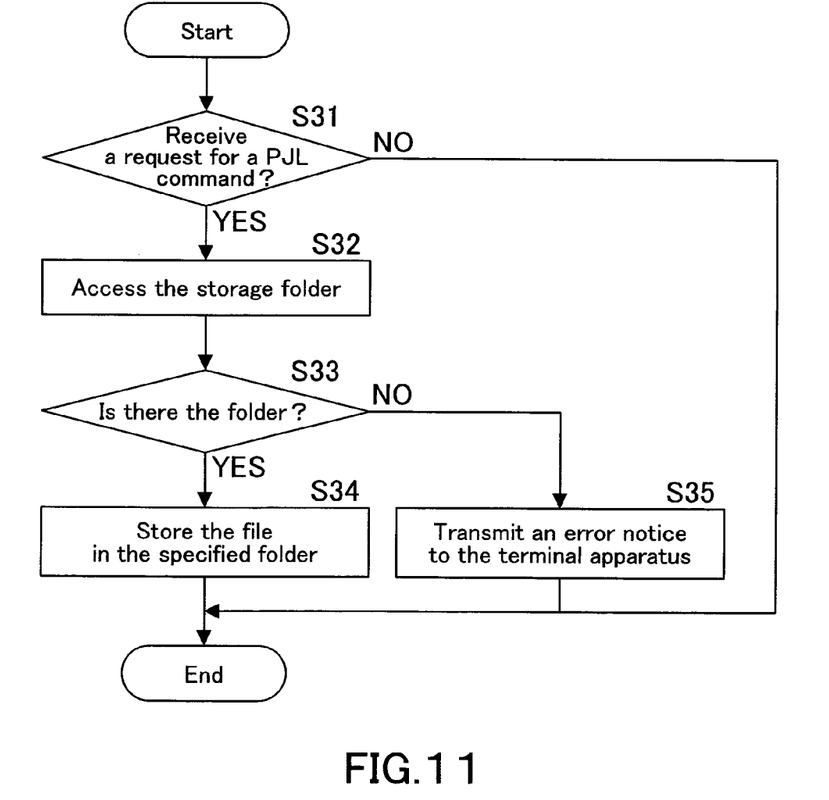
FIG. 11 is a flowchart showing a procedure executed in the printing apparatus when the terminal apparatus obtains a print controlling code stored in the printing apparatus.

Hereinafter, a procedure executed in the terminal apparatus 2 or 3 and the printing apparatus 1 when the terminal apparatus 2 or 3 obtains a file having a PJL command, which is stored in the printing apparatus 1, will be explained with reference to flowcharts shown in FIG. 10 and FIG. 11.

Initially, the procedure executed in the terminal apparatus 2 or 3 will be explained with the flowchart of FIG. 10. This procedure is executed by the CPU 21 of the terminal apparatus 2 or 3 according to an operation program stored in a recording medium such as the ROM 22.

In Step S21, a preferable file is selected from a list according to user instruction. And a storage folder is specified in Step S22, then the "execute" button 253 is pressed and thereby a request for a PJL command is issued in Step S23.

Subsequently, the procedure executed in the printing apparatus 1 will be explained with the flowchart of FIG. 11. This procedure is executed by the CPU 10 of the printing apparatus 1 according to an operation program stored in a recording medium such as the ROM 11.

In Step S31, it is judged whether or not there is a request for a PJL command received from the terminal apparatus 2 or 3. If there is not such a request (NO in Step S31), the routine terminates. If there is such a request (YES in Step S31), an access to the specified storage folder is made in Step S32, and in Step S33, it is judged whether or not there exists the specified folder.

If there exists that folder (YES in Step S33), a file having the PJL command is stored in the folder. If there does not exist that folder (NO in Step S33), an error notice is transmitted to the terminal apparatus.

As described above in this way, the terminal apparatus 2 or 3 obtains a PJL command stored in the printing apparatus 1, and a user using the terminal apparatus can have the same output again by using the obtained PJL command. Further, if a file having the PJL command is shared with other users, they also can have the same output.

SUMMARY OF THE EMBODIMENT

The embodiment described in this specification includes the following printing system, printing apparatus, print setting method and computer readable recording medium having a print setting program.

(1) A printing system in which a terminal apparatus and a printing apparatus are interconnected via a network, and
the terminal apparatus comprising:
an obtainer that gains access to the printing apparatus and obtains print setting screen data stored in the printing apparatus;
a display that displays on itself a print setting screen according to the obtained print setting screen data;
an input part that inputs print setting data via the print setting screen displayed on a display thereof; and
a transmitter that transmits the inputted print setting data to the printing apparatus, and
the printing apparatus comprising:
a receiver that receives the print setting data from the terminal apparatus; and
a code generator that generates an appropriate print controlling code for the received print setting data.

With this printing system, the terminal apparatus gains access to the printing apparatus and obtains print setting screen data stored in the printing apparatus, then displays a print setting screen on a display thereof according to the print setting screen data. When a user enters print setting data via this print setting screen, the terminal apparatus transmits the print setting data to the printing apparatus. Receiving the print setting data from the terminal apparatus, the printing apparatus generates an appropriate print controlling code for the print setting data. Thus, the print setting screen is displayed on the terminal apparatus according to the print setting screen data obtained from the printing apparatus, and the print setting screen is displayed on a general-purpose application such as a web browser usually used on the terminal apparatus. Therefore, users can configure a print setting via a web browser or etc. that they usually use on their terminal apparatuses, without user operations to install thereon an exclusive application for a printing apparatus.

Further with this printing system, the printing apparatus generates an appropriate print setting code for the print setting data entered by a user. Therefore, even if firmware on the printing apparatus is updated, no operation is needed on the terminal apparatus. Thus, users do not have to bother to manually update an application installed on their terminal apparatuses, which would reduce troubles on users.

Further with this printing system, the print setting data is inputted via the print setting screen that is displayed according to the print setting screen data obtained from the printing apparatus. Therefore, a practical print setting for the printing apparatus can be properly configured from the terminal apparatus. Thus, developers of the printing apparatus do not have to develop a prohibition processor for terminal apparatuses, and only have to develop it for the printing apparatus, which would reduce troubles on developers.

(2) The printing system recited in (1) may be configured to have the terminal apparatus further comprising a storage that stores in itself the print controlling code generated by the code generator, and the printing apparatus further comprising a controller that storing the print controlling code generated by the code generator, in the storage of the terminal apparatus.

With this printing system, the code controlling code generated by the code generator is stored from the printing apparatus into a memory of the terminal apparatus. Thus, a user using the terminal apparatus can use the print controlling code again, for example when would like to have the same output.

(3) The printing system recited in (1) may be configured to have the printing apparatus further comprising:
a storage that stores in itself the print controlling code generated by the code generator; and
a controller that gains access to a storage folder specified on the terminal apparatus and storing in the specified storage folder, one or more than one of the print controlling codes stored in the storage, if a request for that one or more than one print controlling codes is received from the terminal apparatus.

With this printing system, if the terminal apparatus issues an request for one or more than one of the print controlling codes stored in a memory of the printing apparatus, the printing apparatus gains access to a storage folder specified on the terminal apparatus and stores in the storage folder, the requested print controlling code(s). Thus, a user can have the same output again by using the print controlling code stored in the printing apparatus. Further, if a file having the print controlling code is shared with other users, they also can have the same output.

(4) A printing apparatus comprising:

a transmitter that transmits print setting screen data to a terminal apparatus, in response to a request for the print setting screen data is received from the terminal apparatus via a network;

a receiver that receives from the terminal apparatus via the network, print setting data inputted via a print setting screen that is displayed on the terminal apparatus according to the print setting screen data; and a code generator that generates an appropriate print controlling code for the received print setting data.

With this printing apparatus, users can configure a print setting via a web browser or etc. that they usually use on their terminal apparatuses, without user operations to install thereon an exclusive application for the printing apparatus. Further, even if firmware on the printing apparatus is updated, no operation is needed on their terminal apparatuses. Thus, users do not have to bother to manually update an application installed on their terminal apparatuses, which would reduce troubles on users. And also, developers of the printing apparatus do not have to develop a prohibition processor for terminal apparatuses, and only have to develop it for the printing apparatus, which would reduce troubles on developers.

(5) The printing apparatus recited in (4) may be configured to further include:

a controller that storing in a storage of the terminal apparatus, the print controlling code generated by the code generator.

With this printing apparatus, a user using the terminal apparatus can use the print controlling code stored in the memory of the printing apparatus, for example when would like to have the same output.

(6) The printing apparatus recited in (4) may be configured to further include:

a storage that stores in itself the print controlling code generated by the code generator; and a controller that gains access to a storage folder specified on the terminal apparatus and storing in the specified storage folder, one or more than one of the print controlling codes stored in the storage, if a request for that one or more than one print controlling codes is received from the terminal apparatus.

With this printing apparatus, a user using the terminal apparatus can have the same output again by using the print controlling code stored in the printing apparatus. Further, if a file having the print controlling code is shared with other users, they also can have the same output.

(7) A print setting method comprising:

accessing a printing apparatus from a terminal apparatus and obtaining print setting screen data stored in the printing apparatus;

displaying a print setting screen on the terminal apparatus according to the obtained print setting screen data;

inputting print setting data via the displayed print setting screen;

transmitting the inputted print setting data to the printing apparatus;

receiving on the printing apparatus, the print setting data from the terminal apparatus; and generating on the printing apparatus, an appropriate print controlling code for the received print setting data.

With this print setting method, users can configure a print setting via a web browser or etc. that they usually use on their terminal apparatuses, without user operations to install thereon an exclusive application for the printing apparatus. Further, even if firmware on the printing apparatus is updated, no operation is needed on their terminal apparatuses. Thus, users do not have to bother to manually update an application installed on their terminal apparatuses, which would reduce troubles on users. And also, developers of the printing apparatus do not have to develop a prohibition processor for terminal apparatuses, and only have to develop it for the printing apparatus, which would reduce troubles on developers.

(8) The print setting method recited in (7) may be configured to further include:

storing the print controlling code generated on the printing apparatus, in a storage of the terminal apparatus.

With this print setting method, a user using the terminal apparatus can have the same output again by using the print controlling code stored in the printing apparatus. Further, if a file having the print controlling code is shared with other users, they also can have the same output.

(9) The print setting method recited in (7) may be configured to further include:

storing the print controlling code generated on the printing apparatus, in a storage of the terminal apparatus;

accessing a storage folder specified on the terminal apparatus and storing in the specified storage folder, one or more than one of the print controlling codes stored in the storage, if a request for that one or more than one print controlling codes is received from the terminal apparatus.

With this print setting method, a user using the terminal apparatus can have the same output again by using the print controlling code stored in the printing apparatus. Further, if a file having the print controlling code is shared with other users, they also can have the same output.

(10) A computer readable recording medium having a print setting program stored therein to make a computer of a printing apparatus execute:

transmitting print setting screen data to a terminal apparatus, in response to a request for the print setting screen data, which is received from the terminal apparatus via a network;

receiving from the terminal apparatus via the network, print setting data inputted via a print setting screen that is displayed on the terminal apparatus according to the print setting screen data; and generating an appropriate print controlling code for the received print setting data.

With this recording medium having the print setting program stored therein, a computer of the printing apparatus executes a process of transmitting print setting screen data to the terminal apparatus in response to a request for the print setting screen data, which is received from the terminal apparatus, a process of receiving print setting data inputted via a print setting screen that is displayed on the terminal apparatus according to the print setting screen data, a process of generating an appropriate print controlling code for the received print controlling code.

(11) The recording medium having the print setting program stored therein, recited in (10), may be configured to make the computer further execute:

storing the generated print controlling code in a storage of the terminal apparatus.

With this recording medium having the print setting program stored therein, the computer further executes a process of storing the generated print controlling code in the memory of the terminal apparatus.

(12) The recording medium having the print setting program stored therein, recited in (10), may be configured to make the computer further execute:

storing the generated print controlling code in a storage of the terminal apparatus; and accessing a storage folder specified on the terminal apparatus and storing in the specified storage folder, one or more than one of the print controlling codes stored in the memory, if a request for that one or more than one print controlling codes is received from the terminal apparatus.

With this recording medium having the print setting program stored therein, the computer further executes a process of storing the print controlling code generated by the code generator in the storage, and a process of accessing a storage folder specified on the terminal apparatus and storing in the storage folder one or more than one of the print controlling codes stored in the memory, if a request for the print controlling code(s) is received from the terminal apparatus.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example" and "NB" which means "note well".

What is claimed is:

1. A printing system in which a terminal apparatus and a printing apparatus are interconnected via a network, and
   the terminal apparatus comprising:
   an obtainer that gains access to the printing apparatus and obtains print setting screen data stored in the printing apparatus;
   a display that displays a print setting screen according to the obtained print setting screen data;
   an input part that inputs print setting data via the print setting screen displayed on the display;
   a transmitter that transmits the inputted print setting data to the printing apparatus; and
   a memory, and
   the printing apparatus comprising:
   a receiver that receives the print setting data from the terminal apparatus;
   a code generator that generates an appropriate print controlling code for the received print setting data; and
   a controller that transmits and stores the print controlling code generated by the code generator, into the memory of the terminal apparatus,
   wherein the terminal apparatus transmits target print data with the print controlling code stored on the memory being attached thereto, to the printing apparatus according to a user operation, and the printing apparatus prints out the target print data according to the print controlling code.

2. The printing system recited in claim 1, wherein the printing apparatus further comprises:
   a storage that stores the print controlling code generated by the code generator; and
   the controller further gains access to a storage folder specified on the memory of the terminal apparatus and stores in the specified storage folder, one or more than one of the print controlling codes stored in the storage, if a request for that one or more than one print controlling codes is received from the terminal apparatus.

3. A printing apparatus comprising:
   a transmitter that transmits print setting screen data to a terminal apparatus, in response to a request for the print setting screen data, which is received from the terminal apparatus via a network;
   a receiver that receives from the terminal apparatus via the network, print setting data inputted via a print setting screen that is displayed on the terminal apparatus according to the print setting screen data;
   a code generator that generates an appropriate print controlling code for the received print setting data; and
   a controller that transmits and stores the print controlling code generated by the code generator, into a memory of the terminal apparatus,
   wherein the terminal apparatus transmits target print data with the print controlling code stored on the memory of the terminal apparatus, to the printing apparatus according to a user operation, and the printing apparatus prints out the target print data according to the print controlling code.

4. The printing apparatus recited in claim 3, further comprising:
   a storage that stores the print controlling code generated by the code generator; and
   the controller further gains access to a storage folder specified on the terminal apparatus and stores in the specified storage folder, one or more than one of the print controlling codes stored in the storage, if a request for that one or more than one print controlling codes is received from the terminal apparatus.

5. A print setting method comprising:

accessing a printing apparatus from a terminal apparatus and obtaining print setting screen data stored in the printing apparatus;

displaying a print setting screen on the terminal apparatus according to the obtained print setting screen data;

inputting print setting data via the displayed print setting screen;

transmitting the inputted print setting data to the printing apparatus;

receiving on the printing apparatus, the print setting data from the terminal apparatus;

generating on the printing apparatus, an appropriate print controlling code for the received print setting data;

receiving on the terminal apparatus and storing the appropriate print controlling code generated on the printing apparatus, on a memory of the terminal apparatus;

transmitting target print data with the print controlling code stored from the terminal apparatus to the printing apparatus according to a user operation; and printing out the target print data according to the print controlling code on the printing apparatus.

6. The print setting method recited in claim 5, accessing a storage folder specified on the terminal apparatus and storing in the specified storage folder, one or more than one print controlling codes stored in the memory, if a request for that one or more than one print controlling codes is received from the terminal apparatus.

7. A non-transitory computer readable recording medium having a print setting program stored therein to make a computer of a printing apparatus execute:

transmitting print setting screen data to a terminal apparatus, in response to a request for the print setting screen data, which is received from the terminal apparatus via a network;

receiving from the terminal apparatus via the network, print setting data inputted via a print setting screen that is displayed on the terminal apparatus according to the print setting screen data;

generating an appropriate print controlling code for the received print setting data;

transmitting and storing the appropriate print controlling code into a memory of the terminal apparatus;

receiving the print controlling code stored from the terminal apparatus according to a user operation; and printing out target print data according to the print controlling code.

8. The recording medium having the print setting program stored therein, recited in claim 7, making the computer further execute:

accessing a storage folder specified on the terminal apparatus and storing in the specified storage folder, one or more than one print controlling codes stored in the memory, if a request for that one or more than one print controlling codes is received from the terminal apparatus.

* * * * *